United States Patent [19]
Johannes

[11] Patent Number: 4,771,199
[45] Date of Patent: Sep. 13, 1988

[54] CENTER-FREE LARGE ANTIFRICTION BEARING WITH INTEGRATED ELECTRICAL DIRECT DRIVE

[75] Inventor: Bertram Johannes, Unna-Billmerich, Fed. Rep. of Germany

[73] Assignee: Hoesch Aktiengesellschaft, Dortmund, Fed. Rep. of Germany

[21] Appl. No.: 39,681

[22] Filed: Apr. 20, 1987

[30] Foreign Application Priority Data

May 10, 1986 [DE] Fed. Rep. of Germany ....... 3615871

[51] Int. Cl.⁴ .............................................. H02K 7/08
[52] U.S. Cl. ....................................... 310/90; 310/85; 384/571; 384/624
[58] Field of Search ................. 310/90, 254, 67 R, 85, 310/157, 261, 154, 91, 254, 261; 384/501, 569, 570, 571, 624, 621, 622

[56] References Cited

U.S. PATENT DOCUMENTS

| | | | |
|---|---|---|---|
| 3,533,497 | 10/1970 | Rojewski | 384/501 |
| 3,751,699 | 8/1973 | Gleichman | 310/90 |
| 4,074,158 | 2/1978 | Cole | 310/90 |
| 4,568,205 | 2/1986 | Basener | 384/501 |
| 4,571,099 | 2/1986 | Balken | 384/501 |
| 4,585,963 | 4/1986 | Wilkinson | 310/67 R |
| 4,696,586 | 9/1987 | Krug | 384/501 |

FOREIGN PATENT DOCUMENTS

| | | | |
|---|---|---|---|
| 2201145 | 7/1973 | Fed. Rep. of Germany. | |
| 0063535 | 5/1980 | Japan | 310/67 R |
| 0904258 | 8/1962 | United Kingdom | 310/67 R |

Primary Examiner—R. Skudy
Attorney, Agent, or Firm—Thomas S. Baker, Jr.

[57] ABSTRACT

A center-free large antifriction bearing consisting of two bearing races comprising rolling bearing elements disposed between them and an integrated electrical direct drive in which the rolling bearing elements are disposed on one side of the direct drive, is characterized in that the bearing races (1, 2) engage over each other at the side of the direct drive (7) opposite the rolling bearing elements (3) and have a spacing (20) which is less than the gap (21) between stator (8) and rotor (9) of the electrical direct drive (7), so that contact of stator and rotor is avoided under all operating conditions.

1 Claim, 1 Drawing Sheet

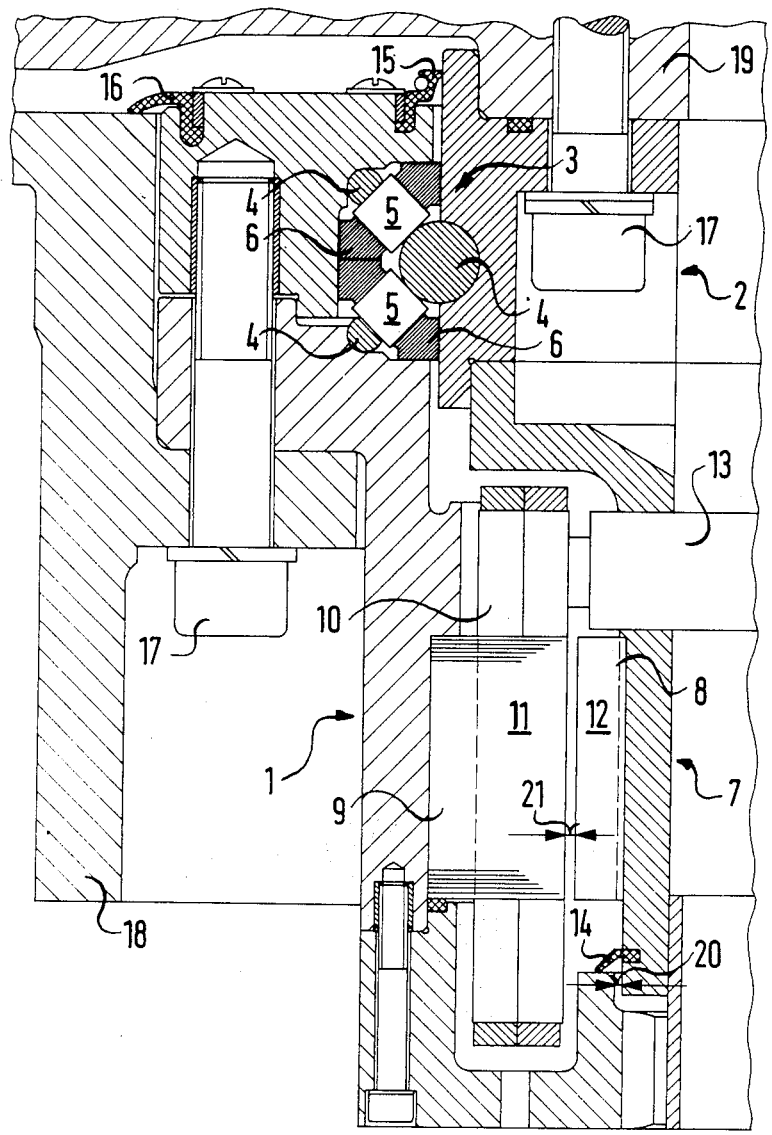

CENTER-FREE LARGE ANTIFRICTION BEARING WITH INTEGRATED ELECTRICAL DIRECT DRIVE

The invention relates to a centre-free large antifriction bearing, consisting of two bearing races comprising rolling bearing elements disposed between them and an integrated electrical direct drive in which the rolling elements are disposed on one side of the direct drive.

Such large antifriction bearings are used for connecting rotatable with stationary constructions when high requirements are made as regards life and freedom from maintenance for a long period, in particular when the speed of rotation and torque load continuously alternate. Due to the freedom from maintenance such combined bearing and drive units are superior to conventional units with gear-type drive in spite of the higher production and control expenditure.

German patent application No. 2,201,145 discloses a centre-free large antifriction bearing with integrated direct drive according to the type of the invention. This large antifriction bearing is not suitable for use in soft-turn connection arrangements and for use with greatly alternating drive forces. Since to obtain a good efficiency of the direct drive the gap between rotor and stator must be kept as small as possible there is a danger that in the aforementioned use under extreme conditions the rotor and stator will contact each other at the side of the direct drive opposite the rolling bearing elements and damage each other.

The invention is based on the problem of ensuring that a contact of rotor and stator is avoided under all operating conditions.

This problem is solved according to the invention in that the bearing races engage over each other at the side of the direct drive opposite the rolling bearing elements and have a spacing which is less than the gap between stator and rotor of the electrical direct drive.

With the solution according to the invention not only a long-life bearing and drive element for use under extreme conditions is provided from the point of view of the function but also it is ensured that the functionability is retained under extreme deflections of the mounting by a soft connection construction or extreme magnetic forces.

An example of embodiment is illustrated in the drawing and will be described hereinafter.

The centre-free large antifriction bearing has an outer race 1 and an inner race 2 between which as rolling bearing elements 3 the running wires 4, rollers 5 and cages 6 are disposed. Furthermore, the races 1, 2 carry the integrated electrical direct drive 7, the stator 8 being integrated in one race and the rotor 9 in the other. The rotor 9 of coil windings 10 of magnetic metal plates 11 is integrated in the outer race 1. The stator 8 consists of permanent magnets 12 which are integrated in the inner bearing race 2. A current supply means 13 provides the electrical direct drive. Seals 14, 15, 16 ensure that the large antifriction bearing is sealed from outside influences and no lubricant can come out of the bearing.

Securing bolts 17 serve to connect the centre-free large antifriction bearing to the lower connection construction 18 and the upper connection construction 19.

To avoid contact of stator 8 and rotor 9 the spacing 20 between the outer race 1 and the inner race 2 at the side of the direct drive 7 opposite the rolling bearing elements 3 is smaller than the gap 21 between the stator 8 and rotor 9.

I claim:

1. Centre-free large antifriction bearing consisting of outer and inner bearing races comprising rolling bearing elements disposed between them and an integrated electrical direct drive including a rotor (9) and a stator (8) in which the rolling bearing elements are disposed on one side of the direct drive, characterized in that the bearing races (1, 2) to avoid contact between the rotor (9) and the stator (8) having a spacing (20) at the side of the direct drive (7) opposite the rolling bearing elements (3) and which is less than a gap (21) between the stator (8) and the rotor (9) of the electrical direct drive (7).

* * * * *